(12) United States Patent
Rousseau (10) Patent No.: US 11,021,331 B2
(45) Date of Patent: Jun. 1, 2021

(54) LUBRICATION SYSTEM FOR ROLLER CHAIN, AND CONVEYING ASSEMBLY EQUIPPED WITH SUCH LUBRICATION SYSTEM

(71) Applicant: Aktiebolaget SKF, Gothenburg (SE)

(72) Inventor: Frederic Rousseau, Saumur (FR)

(73) Assignee: Aktiebolaget SKF, Gothenburg (SE)

( * ) Notice: Subject to any disclaimer, the term of this patent is extended or adjusted under 35 U.S.C. 154(b) by 47 days.

(21) Appl. No.: 16/016,072

(22) Filed: Jun. 22, 2018

(65) Prior Publication Data

US 2019/0009993 A1    Jan. 10, 2019

(30) Foreign Application Priority Data

Jul. 4, 2017    (DE) .................. 102017211308.1

(51) Int. Cl.
| | |
|---|---|
| *B65G 45/08* | (2006.01) |
| *F16N 7/38* | (2006.01) |
| *B65G 17/38* | (2006.01) |
| *F16N 7/36* | (2006.01) |
| *F16N 19/00* | (2006.01) |
| *F16N 13/10* | (2006.01) |

(52) U.S. Cl.
CPC ............ *B65G 45/08* (2013.01); *B65G 17/38* (2013.01); *F16N 7/36* (2013.01); *F16N 7/38* (2013.01); *F16N 13/10* (2013.01); *F16N 19/00* (2013.01); *F16N 2210/24* (2013.01)

(58) Field of Classification Search
CPC ............. B65G 45/08; F16N 7/36; F16N 7/38
USPC ........................................................ 184/15.1
See application file for complete search history.

(56) References Cited

U.S. PATENT DOCUMENTS

| | | | | | |
|---|---|---|---|---|---|
| 1,840,934 | A | * | 1/1932 | Craig ..................... | F16H 57/05 184/15.1 |
| 2,558,370 | A | * | 6/1951 | Miller .................... | B65G 45/08 184/15.1 |
| 3,053,371 | A | * | 9/1962 | Fischer .................. | B65G 45/08 198/500 |
| 3,135,355 | A | * | 6/1964 | Olsen ..................... | B65G 45/08 184/15.1 |
| 3,503,470 | A | * | 3/1970 | Lister .................... | B65G 45/08 184/55.1 |
| 3,869,023 | A | * | 3/1975 | Thomson ............... | B65G 45/08 184/15.2 |
| 4,009,764 | A | * | 3/1977 | Hafner ..................... | F16N 7/02 184/15.2 |

(Continued)

FOREIGN PATENT DOCUMENTS

| | | |
|---|---|---|
| CN | 201057349 Y | 5/2008 |
| CN | 201817079 U | 5/2011 |
| CN | 203571387 U | 4/2014 |

*Primary Examiner* — Michael R Mansen
*Assistant Examiner* — Mark K Buse
(74) *Attorney, Agent, or Firm* — Garcia-Zamor Intellectual Property Law; Ruy Garcia-Zamor; Bryan Peckjian (57) ABSTRACT

A lubrication system for a roller chain. The lubrication system provides a lubricant reservoir, at least one piston pump, and synchronization means. The synchronization means has engaging means dedicated to mechanically mesh with roller chain in motion, and actuating means fastened in motion with the synchronization means the actuating means being in constant mechanical cooperation with a piston pump.

17 Claims, 7 Drawing Sheets

(56) References Cited

U.S. PATENT DOCUMENTS

| | | | | |
|---|---|---|---|---|
| 4,024,930 | A * | 5/1977 | Thomson | B65G 45/08 184/15.3 |
| 4,085,821 | A * | 4/1978 | Kast | B65G 45/08 184/15.2 |
| 4,648,486 | A * | 3/1987 | Kayser | B65G 45/08 184/15.1 |
| 4,844,203 | A * | 7/1989 | Brown | B65G 45/08 184/15.3 |
| 4,877,111 | A * | 10/1989 | Kilper | B65G 45/08 184/15.1 |
| 4,977,979 | A * | 12/1990 | King, Sr. | B65G 45/02 184/15.1 |
| 5,269,614 | A * | 12/1993 | Taylor | B62J 31/00 184/15.1 |
| 5,934,411 | A * | 8/1999 | Murano | F16N 13/06 184/11.5 |
| 5,947,260 | A * | 9/1999 | Sorbara | F16H 57/05 184/12 |
| 6,070,697 | A * | 6/2000 | Millard | F16N 7/12 184/15.1 |
| 6,742,625 | B2 * | 6/2004 | Rodemer | B65G 45/08 184/15.2 |
| 6,932,196 | B2 * | 8/2005 | Rodemer | B65G 45/08 184/15.1 |
| 7,975,805 | B2 * | 7/2011 | Wech | F16N 17/04 184/104.1 |
| 8,171,815 | B2 | 5/2012 | Paluncic | |
| 8,196,489 | B2 | 6/2012 | Paluncic | |
| 9,079,720 | B1 * | 7/2015 | Schmidt | F16H 57/05 |

* cited by examiner

LUBRICATION SYSTEM FOR ROLLER CHAIN, AND CONVEYING ASSEMBLY EQUIPPED WITH SUCH LUBRICATION SYSTEM

CROSS-REFERENCE

This application claims priority to German patent application no. 102017211308.1 filed on Jul. 4, 2017, the contents of which are fully incorporated herein by reference.

TECHNOLOGICAL FIELD

The present invention concerns the field of lubrications systems to apply lubricant such as oil, grease or lubricant mixture with air, on roller chains. The invention also relates to conveying systems with roller chains to transport means of products and goods and equipped with such lubrication system.

BACKGROUND

As a general rule, conveying systems comprise conveying means in motion to transport means of products and goods. Roller chains is a well-known type of the conveying means.

Roller chains generally comprise a plurality of successively aligned rollers, the rollers being rotatably mounted on pins, ends of two successive pins being linked together by side plates.

Such conveying systems further comprise a lubrication system to apply lubricant such as oil, grease or lubricant mixture with air, on roller chain. Such lubrication of roller chain is essential on parts in relative friction, in particular between pins and rollers, rollers and side plates, and between side plates, to maintain optimum mechanical conditions, reduce maintenance tasks and related costs, and to increase service life. Lubricant can be applied manually during regular maintenance process but it is desirable to perform lubrication whiles the roller chain is running. Moreover, access to roller chain may be restricted or impossible for safety reasons.

Automatic lubrication systems are preferably used for lubricating roller chains to make possible more frequent and regular lubrication of roller chain at any timer and desired location. Centralized lubrication systems are well-known to deliver timely metered lubricant quantities to roller chain by the intermediate of lubricant applicators. Such systems can consist in simple oil reservoir with gravity feed, up to sophisticated pumping system with complex automation units. Systems comprise means to detect motion of the roller chain, or is connected to the chain control system, or is specifically calibrated to deliver lubricant at specific locations of chain and at a given frequency. Lubricant applicators of lubricant onto the roller chain can be of the type of a brush in permanent contact with the roller chain, an air spray nozzle to spray lubricant volumes with a regulated air flow at the same time, or an airless nozzle.

It is also known from U.S. Pat. No. 8,171,815 or 8,196,489 lubricant transfer pinions for directly applying a lubricant onto at least one gearwheel. Such lubricant transfer pinion comprises an outer toothing meshing with gearwheel teeth, the pinion being set in rotating motion by the gearwheel rotating motion. Lubricant is transferred by a piston pump from a remote reservoir to such lubricant transfer pinion, and more particularly to lubricant conduits provided within the pinion and having outlets opened on pinion teeth. A device of this type permits to apply lubricant in the desired locations of the gearwheel, pinion and then lubricant delivery being synchronized with the gearwheel motion.

Such lubricant applicator is particularly interesting for timely delivering lubricant to the conveying means, a gearwheel in the cited prior publications or a roller chain in the present application, but still requires automation units. Alternatively, metering means can be provided to outlets of pinion lubricant conduits, but with relative complex design.

SUMMARY

The aim of the invention is to provide a lubrication system for a roller chain that is easy to install, economic for manufacturing and using, able to timely deliver lubricant in precise locations on roller chain, able to deliver precise volumes of lubricant, and adaptable to any type, shape, dimensions and speed of roller chains.

To this end, the invention concerns a lubrication system for a roller chain characterized in that it comprises:
 a lubricant reservoir;
 at least one piston pump having a piston body defining a piston cavity for the displacement of a piston, a piston body inlet connecting the piston cavity to the lubricant reservoir by an inlet pipeline, and a piston body outlet connecting the piston cavity to a lubricant applicator dedicated to supply lubricant to a roller chain portion; and
 synchronization means having engaging means dedicated to mechanically mesh with roller chain in motion, and actuating means fastened in motion with the synchronization means, the actuating means being in constant mechanical cooperation with a portion of the piston of piston pump, the piston being set in a back-and-forth motion in the cavity of piston pump by the actuating means.

Thanks to the invention, the lubricant system supplies lubricant to a roller chain portion synchronously with the roller chain motion. More precisely:

The lubricant system comprises synchronization means set in a motion synchronously with the roller chain motion. The motion of synchronization means is synchronized with the passage of rollers of roller chains, more particularly the rollers speed and also the rollers position with respect to gaps between two adjacent rollers are transmitted to the motion of synchronization means.

This motion of synchronization means is transferred into a back-and-forth motion of a piston of a piston pump by the intermediate of actuating means fastened in motion with the synchronization means. The back-and-forth motion of piston induces the suction of lubricant from a lubricant reservoir into the piston pump cavity during a back motion of piston, and then lubricant is pushed from the piston pump cavity to a lubricant applicator during a forth motion of piston. The lubricant applicator applies lubricant to a dedicated roller chain portion.

The cavity of piston pump for piston displacement is set for a necessary volume of lubricant to efficiently lubricate the roller chain. The lubricant volume supplied at each piston displacement is controlled and ensures a cost effective lubricant system.

The lubrication system is automatable and then do not request hand lubrication of the roller chain.

Synchronization means cooperate only mechanically with both the roller chain and the piston pump. The synchronization between the roller chain and the lubrication system is simplified compared to the known automation units that require control units, sensors and dedicated software. The piston pump only works mechanically and does not require electrical connection or control means. Such lubrication system can be easily installed on any portion of a roller chain and only requires a fixed structure to maintain the piston pump and the synchronization means.

Piston is actuated only when the roller chain is in motion, and then lubricant supplied only when necessary during use of the roller chain. The lubrication system is cost effective for the lubricant quantity and does not require start-and-stop means.

According to further aspects of the invention which are advantageous but not compulsory, such a lubrication system for roller chain may incorporate one or several of the following features:

The lubricant reservoir is a gravity reservoir, lubricant being supplied from reservoir to the piston pump by gravity.

The lubricant reservoir is a pressurized reservoir or is connected to a pressurized supply system, lubricant being supplied under pressure from reservoir to the piston pump.

The lubricant applicator is a brush.

The lubricant applicator is an airless nozzle.

The lubricant applicator is an air spray nozzle.

The synchronization means comprise a pinion, the engaging means being formed by a plurality of radial teeth on the pinion outer periphery, the teeth meshing with roller chain, motion of roller chain being transferred into a rotating motion of the pinion.

The actuating means are formed by a plurality of radial teeth of pinion, so that a portion of piston cooperates mechanically and alternatively with the teeth and crenels defined between two adjacent teeth when the pinion is in rotating motion.

The teeth on the outer periphery of pinion are both the actuating and engaging means.

The teeth forming the actuating means are provided on the outer periphery of a secondary pinion fastened in rotation with a primary pinion, the primary pinion being provided on its outer periphery with teeth forming the engaging means.

Secondary pinion is of common rotation axis with primary pinion, and is of reduced outer diameter than the primary pinion.

The synchronization means comprise a driving rod, the engaging means being formed by a first end of the driving rod and having a shape suitable for mechanically meshing with roller chain, motion of roller chain being transferred into a translating back-and-forth motion of the driving rod.

The actuating means are formed by a second end of the driving rod.

The invention also concerns a conveying system comprising a roller chain having a plurality of rollers rotatably mounted on pins, ends of two adjacent pins being attached together by means of a side plate, and a lubrication system according to any of the previous embodiments.

BRIEF DESCRIPTION OF THE DRAWINGS

The invention will now be explained in correspondence with the annexed figures, as an illustrative example, without restricting the object of the invention. In the annexed figures.

DETAILED DESCRIPTION

A lubrication system 1 for a roller chain 2 is illustrated in the annexed Figures according to embodiments of the present invention.

Roller chain 2 comprises a plurality of successively aligned rollers 3. Rollers 3 are cylindrical around a central axis, central axis of rollers being parallel one to the other. Each of the rollers 3 is rotatably mounted around a pin 4 of common central axis with the central axis of the associated roller 3. Each of the pins 4 comprises two opposite ends 5. Ends 5 of two successive pins 4 on each side of the roller chain 2 are linked together by a side plate 6. Roller chain 2 is set in motion along the direction V2. Such roller chain 2 permits to convey means of products and goods.

Lubrication system 1 for such roller chain 2 comprises a lubricant reservoir 7. The reservoir 7 can be located in a suitable location with respect to the rest of the system 1 and the roller chain 2. Reservoir 7 can be of any suitable type, in particular a gravity reservoir, lubricant being supplied from reservoir by gravity, or a pressurized reservoir or a reservoir connected to a pressurized supply system, lubricant being supplied under pressure from reservoir.

Lubrication system 1 also comprises a piston pump 8. Piston pump 8 is in fluid connection with lubricant reservoir 7 by a lubricant pipeline 9.

Piston pump 8 comprises a piston body 10 having an inner cavity (not illustrated). Inner cavity comprises an inlet opening 11 connected to pipeline 9. Lubricant can then be transferred from the lubricant reservoir 7 to the cavity of piston body 10 by the pipeline 9 and the inlet opening 11.

Cavity of piston body 10 receives a piston 12, the piston 12 having a back-and-forth movement within the cavity. The piston motion will be further described below. Cavity further comprises an outlet opening 13. The back-and-forth motion of piston 12 in cavity of piston body 10 induces the suction of lubricant from lubricant reservoir 7 into the inlet opening 12 and then the cavity during a back motion of piston, and then lubricant is pushed out from the cavity to the outlet opening 13. The volume of lubricant expelled from the piston pump is defined by the piston displacement volume in cavity.

Lubrication system 1 further comprises a lubricant applicator 14 in fluid connection with the outlet opening 13 of piston pump 8. Lubricant can then be transferred from lubricant reservoir 7 to lubricant applicator 14 by the intermediate of piston pump 8 when the piston 12 is set in motion. Lubricant applicator 14 applies lubricant to a specific portion of roller chain 2, more particularly in the connection zone between ends 5 of pins 4, rollers 3 and side plates 6. Lubricant applicator 14 can be of any suitable type, for example a brush or an air spray nozzle. An airless lubricant delivery method is preferable to prevent direct contact with roller chain 2 to increase the lifetime of the chain 2 and applicator 14, and to prevent the use of mixed air with lubricant to reduce risks of mist/airborne contamination.

According to the invention, lubrication system 1 comprises synchronization means meshing with roller chain 2 so as to have a synchronized motion with the roller chain 2, and to transfer this motion into a back-and-forth motion of piston 12 that is also synchronized with the roller chain motion.

Figure 1A:
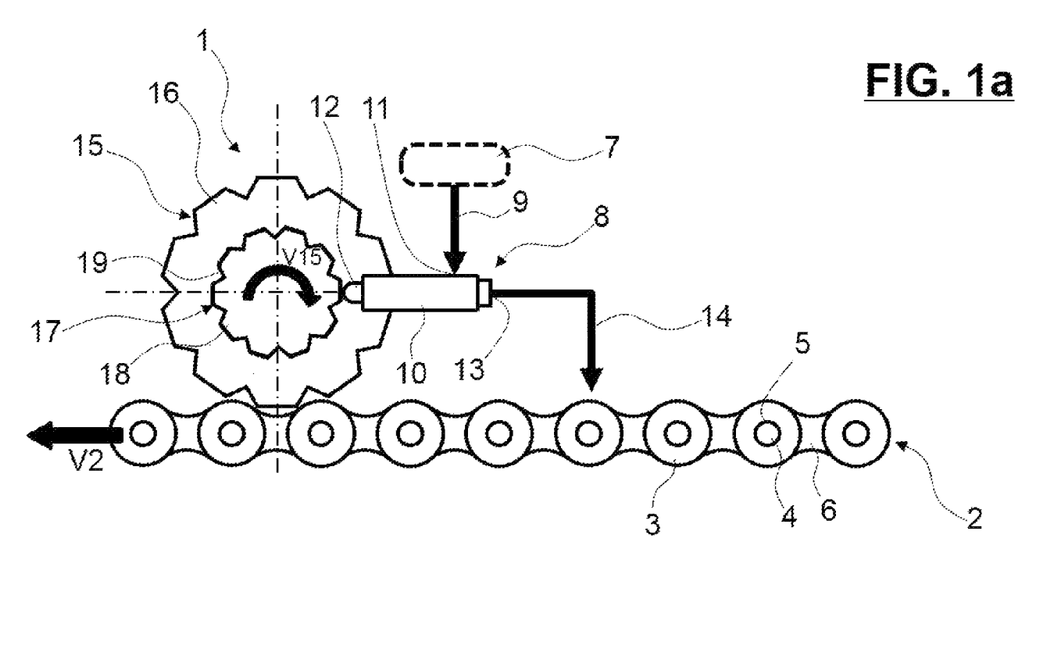
FIGS. 1a and 1b are schematic views of a lubrication system for a roller chain according to a first embodiment of the invention, in a first and second positions.
Figure 1B:
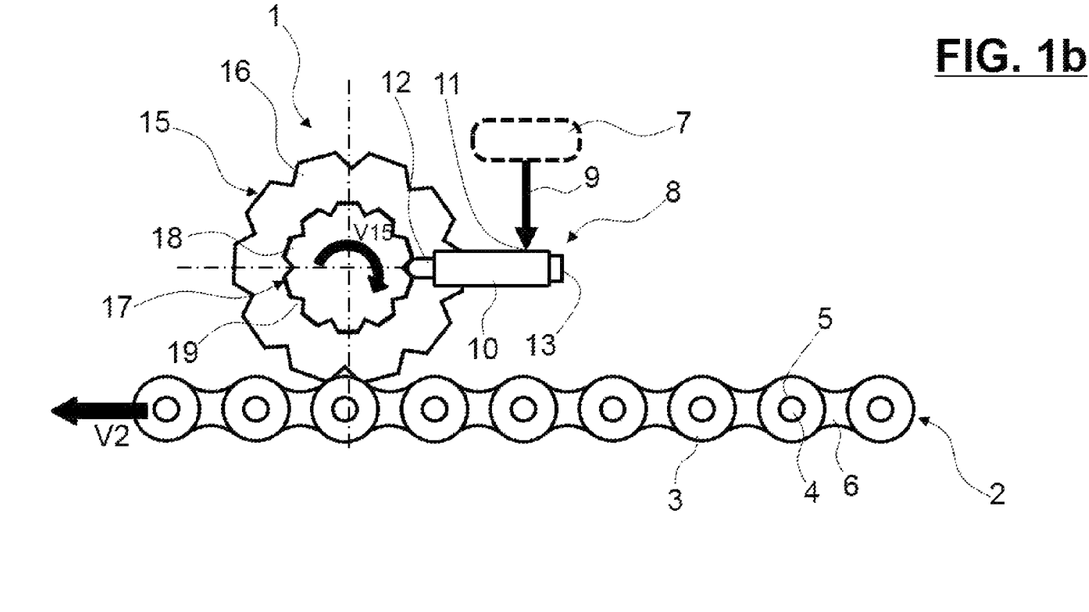

In the first embodiment of the present invention as illustrated in FIGS. 1a and 1b, the synchronization means comprise a primary pinion 15. Primary pinion 15 is provided with a plurality of radial teeth 16 on the pinion outer periphery forming engaging means with the roller chain 2. The teeth 16 mesh with rollers 3 of roller chain 2, motion V2 of roller chain 2 being transferred into a rotating motion V15 of the primary pinion 15 as illustrated in FIG. 1a in a first position and FIG. 1b in a second position after motion of roller chain 2. The rotating motion V15 of primary pinion 15 is synchronized with the linear motion V2 of roller chain 2, more particularly the rotation of primary pinion 15 is synchronized with the passages of rollers 3.

In the present embodiment, synchronization means of lubrication system 1 further comprises a secondary pinion 17. Secondary pinion 17 is fastened in rotation with the primary pinion 15, and is of common rotation axis with the primary pinion 15. In the exemplary embodiment, secondary pinion 17 is of reduced outer diameter than the primary pinion 15. Secondary pinion 17 is provided with a plurality of radial teeth 18 on its outer periphery forming actuating means with the piston 12 of piston pump 8. The rotating motion of secondary pinion 17 is synchronized with the linear motion V2 of roller chain 2, more particularly the rotation of teeth 18 of secondary pinion 17 is synchronized with the passages of rollers 3.

Secondary pinion 18 of synchronization means is in constant contact with an end portion of piston 12. Piston 12 is then alternatively actuated by teeth 18 and crenels 19 defined between two adjacent teeth 18. When the secondary pinion 17 rotates, set in rotating motion by the primary pinion 15 and the roller chain 2, the teeth 18 and crenels 19 also rotate and come alternatively into contact with the piston 12 of the fixed piston pump 8.

When a tooth 18 of secondary pinion 17 contacts the piston 12 as illustrated in FIG. 1a, the piston 12 is pushed within the cavity of piston body 10, and then expel lubricant from the cavity to the outlet opening 13 and then to the lubricant applicator 14 and finally to the dedicated roller chain portion 2. When the roller chain 2 continues its motion V2, the secondary piston 17 rotates and then a crenel 19 contacts the piston 12 as illustrated in FIG. 1b. The piston 12 has a back motion since the crenels forms a recess with tooth 18. The piston back motion induces the suction of lubricant from lubricant reservoir 7 into the inlet opening 11 and then the cavity of piston body 10. No lubricant is delivered from the piston pump 8 to the lubricant applicator and then to the roller chain 2.

The delivery of lubricant to the dedicated portion of roller chain 2 is then synchronized with the passage of rollers in one defined location of roller chain 2 where the primary pinion 15 is arranged. At each passage of a roller 3 during the roller chain motion, the primary pinion 15 rotates, and then the secondary pinion 17 rotates in the same motion, the piston pump 8 being timely actuated to deliver lubricant.

The advantage of a secondary pinion according to the first embodiment of the invention is that smaller teeth can be used to actuate the piston, and then permits a smoother piston movement.

Figure 2A:
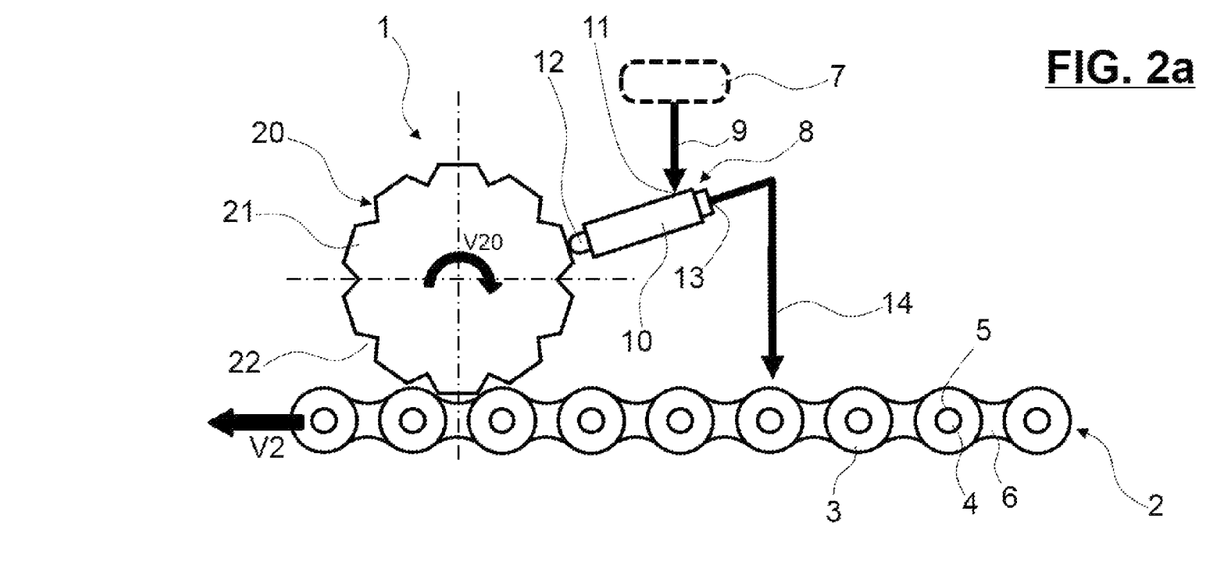
FIGS. 2a and 2b are schematic views of a lubrication system for a roller chain according to a second embodiment of the invention.
Figure 2B:
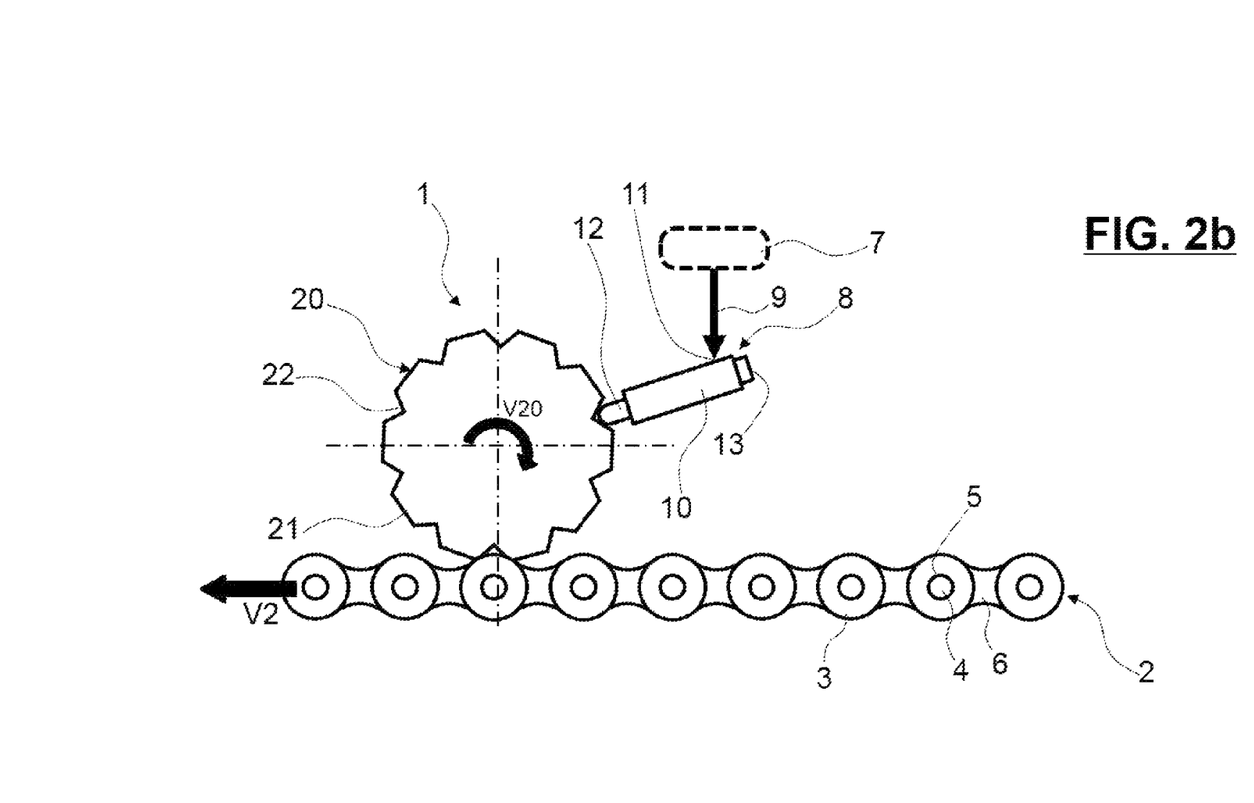

The FIGS. 2a and 2b illustrate a second embodiment of the invention, wherein the same elements have the same reference numbers, that differs from the previous embodiment in that the synchronization means of lubrication system 1 only comprises one pinion 20.

Pinion 20 is provided with a plurality of radial teeth 21 on the pinion outer periphery forming engaging means with the roller chain 2. The teeth 21 mesh with rollers 3 of roller chain 2, motion V2 of roller chain 2 being transferred into a rotating motion V20 of the primary pinion 15 as illustrated in FIG. 2a in a first position and FIG. 2b in a second position after motion of roller chain 2.

The teeth 21 of pinion 20 also define crenels 22 between adjacent teeth, so as to form actuating means with the piston 12 of piston pump 8. The rotating motion of pinion 20 is synchronized with the linear motion V2 of roller chain 2, more particularly the rotation of teeth 21 and crenels 22 of pinion 20 is synchronized with the passages of rollers 3.

Pinion 20 of synchronization means is then in constant contact with an end portion of piston 12. Piston 12 is then alternatively actuated by teeth 21 and crenels 22 and is set in back-and-forth motion in the fixed piston pump 8.

The advantage of a lubrication system with only one pinion is that the synchronization means is of reduced cost and is still efficient to actuate the piston.

Figure 3:
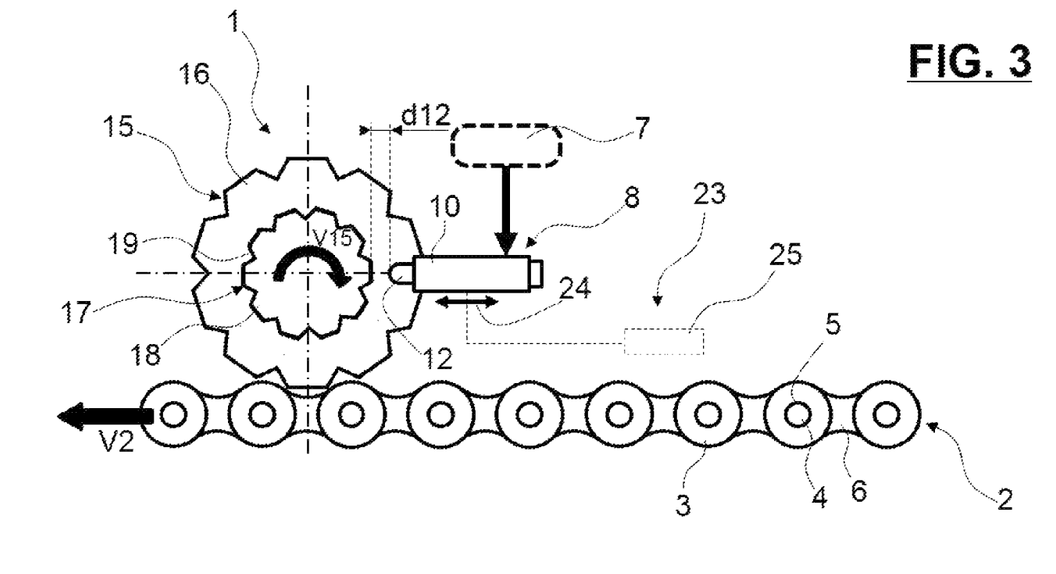
FIG. 3 is a schematic view of a third embodiment of the lubrication system of FIGS. 1a and 1b.

The FIG. 3 illustrates a third embodiment of the invention, wherein the same elements have the same reference numbers, that differs from the previous embodiments in that the lubrication system 1 further comprises start-and-stop means 23.

Start-and-stop means 23 prevent any direct contact between the actuating means of the synchronization means and the piston. Start-and-stop means comprise translating means 24 of the piston body 10 of piston pump 8 with respect to a fixed structure supporting the roller chain 2. The translating means 24 may consist in rails or any other suitable means. The translating means can be manually, mechanically or automatically controlled. A pneumatic control unit 25 can be connected to the translating means 24, compressed air controlling the translating means and setting the relative position of piston pump 8 with respect to the pinions 17, 18.

In the present embodiment illustrated in FIG. 3, piston body 10 is moved away from pinion 17, piston 12 being at the end of its back motion, and a gap d12 is set between the outer periphery of teeth 18 of secondary pinion 17 and the piston 12. Even in case of motion V2 of roller chain 2 and rotating motion of pinions 15, 17, the piston 12 cannot be actuated by teeth 18 and crenels 19 of secondary pinion 17. In this position, no lubricant can be supplied to the roller chain 2 even when the roller chain is in motion.

Figure 4A:
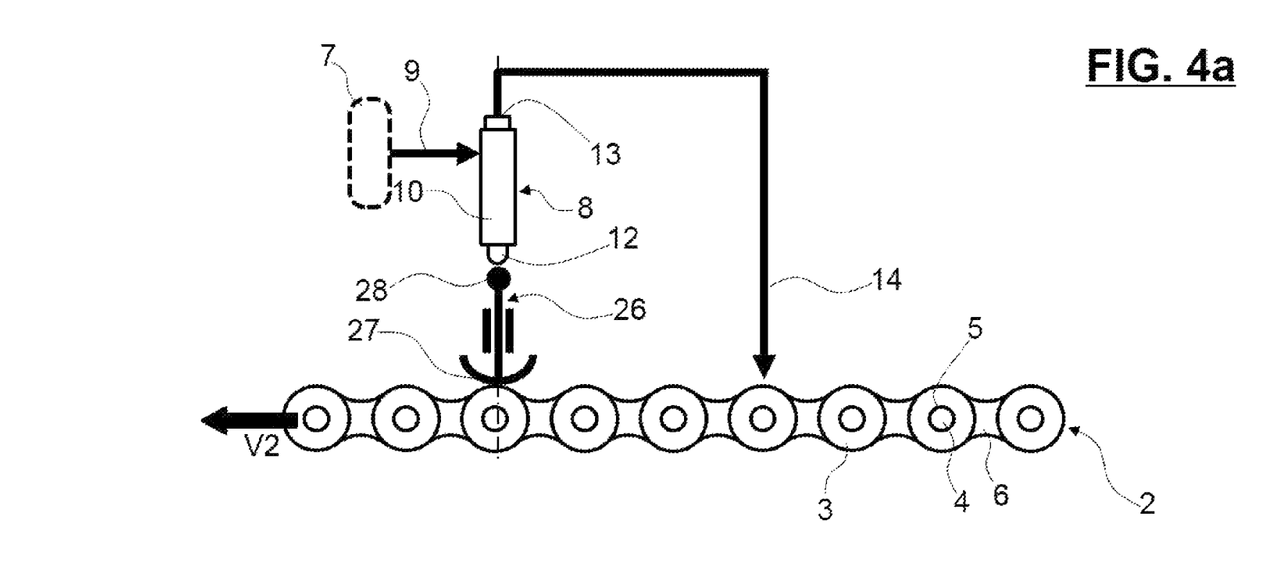
FIGS. 4a and 4b are schematic views of a lubrication system for a roller chain according to a fourth embodiment of the invention.
Figure 4B:
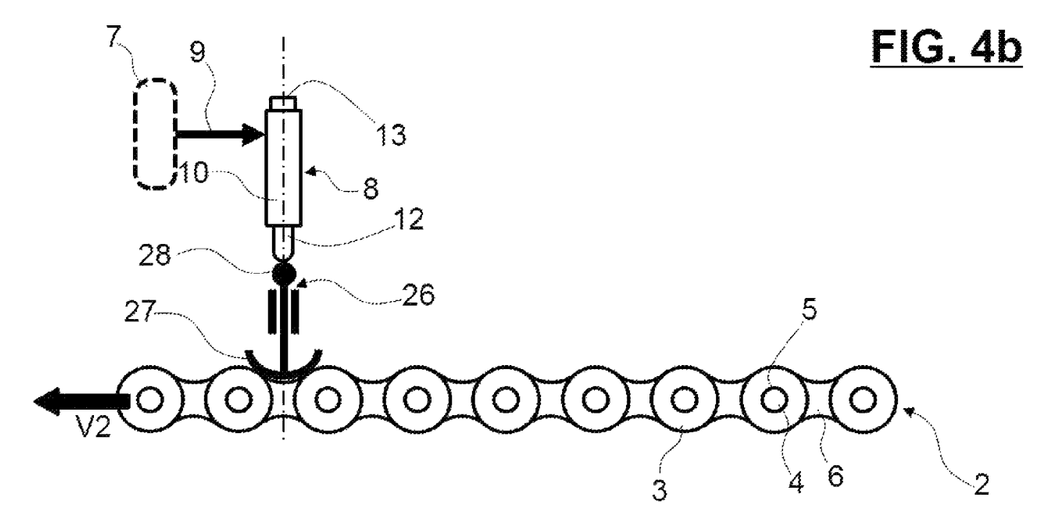

The FIGS. 4a and 4b illustrate a fourth embodiment of the invention, wherein the same elements have the same reference numbers, that differs from the previous embodiment in that the synchronization means of lubrication system 1 comprise a driving rod 26.

The engaging means are formed by a first end 27 of the driving rod 26 and having a shape suitable for mechanically cooperating with the rollers 3 of roller chain 2. In the exemplary embodiment, engaging means 27 have a semi-circular shape so as to slide on rollers 3 when the roller chain is in motion V2. Motion of roller chain 2 is then transferred into a linear back-and-forth motion of the driving rod 26 as illustrated in FIG. 4a in a first position and FIG. 4b in a second position after motion of roller chain 2. The linear back-and-forth motion of driving rod 26 is synchronized with the linear motion V2 of roller chain 2, more particularly is synchronized with the passages of rollers 3.

The actuating means are formed by a second end 28 of the driving rod 26, the actuating means 28 being in the same linear back-and-forth motion as the engaging means 27.

End 28 of driving rod 26 is in constant contact with an end portion of piston 12. Piston 12 is then alternatively actuated by the back-and-forth motion of the end 28.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provided improved lubrication system for roller chain.

Moreover, various features of the above-described representative examples, as well as the various independent and dependent claims below, may be combined in ways that are not specifically and explicitly enumerated in order to provide additional useful embodiments of the present teachings.

What is claimed is:

1. A lubrication system for a roller chain that comprises:
a lubricant reservoir;
at least one piston pump having a piston body defining a piston cavity for the displacement of a piston, a piston body inlet connecting the piston cavity to the lubricant reservoir by an inlet pipeline, and a piston body outlet connecting the piston cavity to a lubricant applicator dedicated to supply lubricant to a portion of the roller chain; and
synchronization means having engaging means dedicated to mechanically mesh with the roller chain in motion, and actuating means fastened in motion with the synchronization means, the actuating means being in constant mechanical cooperation with a portion of the piston of the piston pump, the piston being set in a back-and-forth motion in the cavity of piston pump by the actuating means,
wherein the synchronization means comprises a pinion, the engaging means being formed by a plurality of radial teeth on an outer periphery of the pinion, each of the plurality of radial teeth, when viewed in cross-section, defining a flat surface.

2. The lubrication system according to claim 1, wherein the lubricant applicator is an airless nozzle.

3. The lubrication system according to claim 1, wherein the plurality of radial teeth also meshes with the roller chain such that motion of the roller chain is transferred into a rotating motion of the pinion.

4. The lubrication system according to claim 1, wherein the actuating means are formed by a plurality of radial teeth of a pinion, so that a portion of the piston cooperates mechanically and alternatively with the plurality of radial teeth and a plurality of crenels defined between two adjacent ones of the plurality of radial teeth when the pinion is in a rotating motion.

5. The lubrication system according to claim 4, wherein the teeth forming the actuating means are provided on the outer periphery of a secondary pinion fastened in rotation with a primary pinion, the primary pinion being provided on its outer periphery with teeth forming the engaging means.

6. The lubrication system according to claim 5, wherein the secondary pinion shares a common rotation axis with the primary pinion, and has a smaller outer diameter than the primary pinion.

7. The lubrication system according to claim 1, wherein the plurality of radial teeth on the outer periphery of the pinion are both the actuating and engaging means.

8. A conveying system comprising:
a roller chain having a plurality of rollers rotatably mounted on pins, ends of the two adjacent pins being attached together by means of a side plate, and a lubrication system according to claim 1.

9. The lubrication system according to claim 1, wherein the lubricant reservoir is a gravity reservoir.

10. The lubrication system according to claim 1, wherein the lubricant reservoir is a pressurized reservoir.

11. A lubrication system for a roller chain that comprises:
a lubricant reservoir;
at least one piston pump having a piston body defining a piston cavity for the displacement of a piston, a piston body inlet connecting the piston cavity to the lubricant reservoir by an inlet pipeline, and a piston body outlet connecting the piston cavity to a lubricant applicator dedicated to supply lubricant to a portion of the roller chain; and
synchronization means having engaging means dedicated to mechanically mesh with the roller chain in motion, and actuating means fastened in motion with the synchronization means, the actuating means being in constant mechanical cooperation with a portion of the piston of the piston pump, the piston being set in a back-and-forth motion in the cavity of piston pump by the actuating means,
wherein the synchronization means comprises a driving rod, the engaging means being formed by a first end of the driving rod and having a shape suitable for mechanically meshing with roller chain, motion of the roller chain being transferred into a translating back-and-forth motion of the driving rod,
wherein the roller chain comprises a plurality of curved side plates, the first end of the driving rod being configured to contact each of the plurality of curved side plates.

12. The lubrication system according to claim 11, wherein the actuating means are formed by a second end of the driving rod.

13. The lubrication system according to claim 11, wherein the lubricant reservoir is a gravity reservoir.

14. The lubrication system according to claim 11, wherein the lubricant reservoir is a pressurized reservoir.

15. A lubrication system for a roller chain that comprises:
a lubricant reservoir;
at least one piston pump having a piston body defining a piston cavity for the displacement of a piston, a piston body inlet connecting the piston cavity to the lubricant reservoir by an inlet pipeline, and a piston body outlet connecting the piston cavity to a lubricant applicator dedicated to supply lubricant to a portion of the roller chain;
synchronization means having engaging means dedicated to mechanically mesh with the roller chain in motion, and actuating means fastened in motion with the synchronization means, the actuating means being in constant mechanical cooperation with a portion of the piston of the piston pump, the piston being set in a back-and-forth motion in the cavity of piston pump by the actuating means; and
a stop-and-start means preventing any direct contact between the actuating means of the synchronization means and the piston body, comprising a translating means connected to a pneumatic control unit, the pneumatic control unit controlling the translating means and setting a relative position of the piston pump with respect to the synchronization means.

16. The lubrication system according to claim 15, wherein the lubricant reservoir is a gravity reservoir.

17. The lubrication system according to claim 15, wherein the lubricant reservoir is a pressurized reservoir.

* * * * *